G. S. GALLAGHER AND G. SCHADEE.

VEHICLE WHEEL.

APPLICATION FILED FEB. 13, 1919.

Reissued Sept. 13, 1921.

15,191.

George S. Gallagher Inventors
Gustav Schadee
By Vernon E. Hoff
their Attorney

UNITED STATES PATENT OFFICE.

GEORGE S. GALLAGHER AND GUSTAV SCHADEE, OF NEW YORK, N. Y., ASSIGNORS, BY MESNE ASSIGNMENTS, TO EMMA G. GALLAGHER AND ALICE SCHADEE, BOTH OF NEW YORK, N. Y.

VEHICLE-WHEEL.

Specification of Reissued Letters Patent. Reissued Sept. 13, 1921.

15,191.

Original No. 1,215,924, dated February 13, 1917, Serial No. 68,335, filed December 23, 1915. Application for reissue filed February 13, 1919. Serial No. 276,848.

*To all whom it may concern:*

Be it known that we, GEORGE S. GALLAGHER and GUSTAV SCHADEE, both citizens of the United States, and residents of the borough of Manhattan, city, county, and State of New York, have invented an Improvement in Vehicle-Wheels, of which the following is a specification.

As is evidenced by their almost universal employment, pneumatic tires have been found the most satisfactory for motor vehicle wheels. It is generally known, however, that in the use of these tires for this purpose, many difficulties are experienced from cuts, punctures, blow-outs and like mishaps due to glass, nails, or other foreign articles in the road and also to extreme variations in temperature. We are aware that heretofore various resilient vehicle wheels have been designed, but in none of them, so far as we know, are the same advantages obtained as in the use of a pneumatic tire.

While our invention relates generally to a vehicle wheel its novelty resides more particularly in the tire construction thereof and the object of our invention is the provision of a vehicle wheel with a tire so constructed that all the advantages of a pneumatic tire are retained and all the disadvantages and inconveniences incident to the use of pneumatic tires are substantially eliminated. Our improved tire is so constructed as to be practically puncture and blow-out proof and we also employ devices whereby if for any reason the pneumatic tubes employed have the air pressure reduced or become flattened, the vehicle may be run on the solid tread as far as may be necessary to reach a convenient place for inflating the tires or making other repairs.

Our invention will be hereinafter more particularly described in connection with the accompanying drawings in which, Figure 1 is an elevation of a vehicle wheel fitted with a tire made in accordance with our invention;

Figure 1:
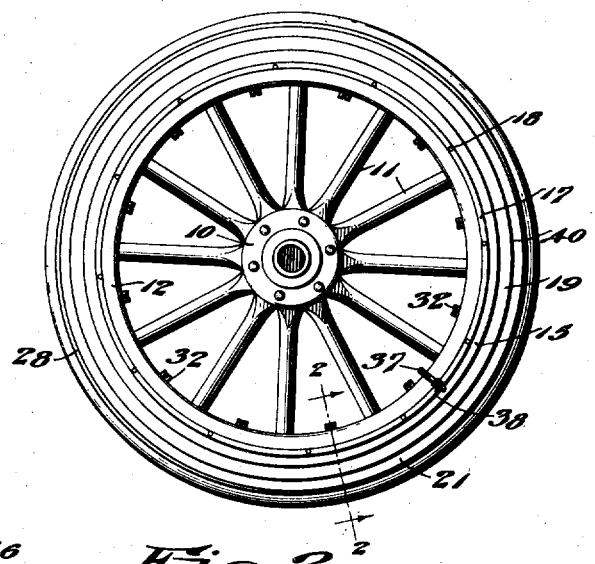
Figure 3:
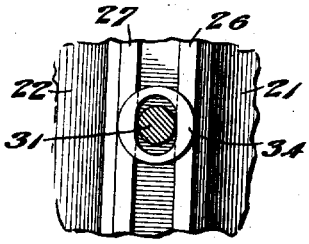
Fig. 3 is a cross section on line 3, 3, Fig. 2.

Referring to the drawing, 10 indicates the hub of a vehicle wheel, and 11 its spokes which as customary are secured at one end in the hub and at the other end in a felly 12, which in the construction herein shown becomes an inner rim.

We also employ an inner rim indicated at 13 adapted to fit upon and abut against the felly 12. Centrally the outer face of the rim 13 is recessed at 14 and the inner rim 13 is flanged or extended as indicated at 15—16. This inner rim 13 is also provided with cleats 17 or other means by which through suitable bolts 18 the felly and inner rim are connected and secured together. In any manner known to the art, we secure a pneumatic tube 19 to the flange 15 of the inner rim 13, and similarly a pneumatic tube 20 is secured to the flange 16 of the inner rim 13.

Associated with the pneumatic tubes there is an outer rim which as shown in the drawing is made in two parts indicated at 21 and 22. Each of these parts is circular and recessed to receive the outer portion of the pneumatic tubes. At its inner edge the outer rim member 21 is flanged as indicated at 23 and similarly at its inner edge the outer rim member 22 is flanged as indicated at 24. The flanged parts 23 and 24 of the outer rim members are adapted to overlap and contact with each other lying between the adjacent sides of the pneumatic tubes 19 and 20, and these flanged parts of the outer rim member may be conveniently secured together by means of screws 25 or otherwise. For convenience of construction we have illustrated this circular flanged outer rim member as made in two parts; as will be understood, however, the same may be rolled in one part without departing from the nature of our invention.

The flanged part 23 of the outer rim member 21 is provided with ribs 26 and 27, spaced equal distances from the center of the flange and extending entirely around the same, the purposes and functions of these ribs will be hereinafter described. The outer rim member 21 exteriorly is ribbed as indicated at 28 and similarly the outer rim member 22 is correspondingly ribbed as indicated at 29. A solid tread member 30 made of rubber or other similar material is secured in the outer rim member and extends between the flanges 28 and 29.

When made of rubber the tread member 30 is preferably vulcanized in place in the circular outer rim member.

We also employ a plurality of plungers indicated at 31. Each plunger 31 is connected to a screw 32 passing through the felly 12 and the inner rim 13, in which latter each screw 32 is adjustable to position by being turned to place or otherwise. Each plunger 31 is of materially smaller diameter than the screw to which it is connected and at their outer or free ends the plungers 31 pass into the space between the ribs 26 and 27. Each plunger also is surrounded with a helical spring 33 bearing at one end against a shoulder formed between a plunger and its screw and at the other end against a washer 34, each washer being set in a recess provided therefor in the outer edges of the ribs 26 and 27. The opening in each of these washers is elongated, extending circumferentially of the tire, and the width of the opening in the washer as well as the distance between the ribs 26 and 27 is substantially the same as the diameter of the plungers 31. This construction as it will be understood provides for a yielding connection between the felly and its inner rim and the outer rim and its tread member.

In any suitable position the flange 15 of the inner rim 13 is fitted with valve 35 and in a corresponding position the flange 16 is fitted with a valve 36 and these valves are connected by a pipe or hose 37 which as will be seen in the drawing spans the felly 12. The valve 35 is also fitted with a union or coupling 38 by which a suitable connection may be made with a pipe leading from the source of compressed air or other fluid employed to inflate the pneumatic tubes.

Figure 2:
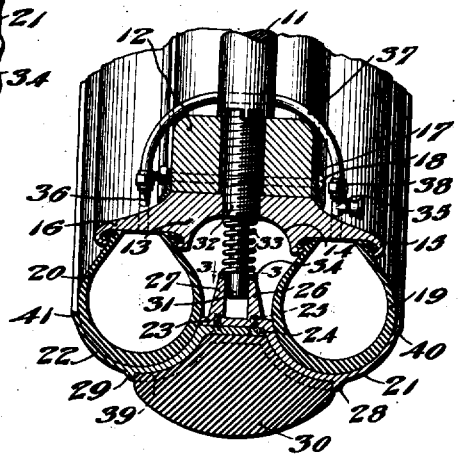
Fig. 2 is an enlarged cross section on the line 2, 2, Fig. 1.

As indicated at 39, the inner surfaces of the outer rim members 21 and 22 may be corrugated and the adjacent surface of the pneumatic tubes correspondingly corrugated so as to prevent any slip between these surfaces when in use and as is also clearly shown in Fig. 2, the outer edge of the outer rim member 21 is rolled or rounded as indicated at 40 and this edge terminates appreciably below the center of the pneumatic tube 19. This is to obviate any possibility of cutting the pneumatic tube, should for any reason the same become deflated or flat and so work over the edge of the rim; and for the same reason the outer edge of the outer rim member 22 is similarly rounded as indicated at 41. With the same object in view the inner face of the flanged part 23 of the rim member 21 is also appreciably below the center of the pneumatic tubes.

These edges 40 and 41 also constitute the outermost portions of the wheel and hence form a curb-guard for the tire, effectually preventing the clencher flanges 15 and 16 or the tubes 19 and 20 from ever striking and rubbing or turning against the curb or other outside obstruction.

From the foregoing it will be apparent that the pneumatic tubes may be simultaneously inflated to any desired pressure and due to the pressure equalizer pipe 27, the pressure in one tube will always be equal to that in the other; also the adjusting screws 32 may be turned to vary the pressure exerted by the springs 33 so that the extent of the assistance given by these springs to pneumatic tubes may be controlled within a relatively large range. It will, furthermore, be apparent if for any reason pneumatic tubes become deflated or flat the vehicle in which this wheel is used may be run indefinitely on the resilient devices comprising the sockets 30, the plungers 31, the adjusting screws 32 and the springs 33.

We claim as our invention:

1. A vehicle wheel including inner and outer rims, pneumatic tubes arranged between the same, springs and guides therefor interposed in the space between said rims and tubes, and means for regulating the tension of the springs.

2. In a vehicle wheel and in combination, a felly, a plurality of pneumatic tubes connected thereto, an outer rim, a solid tread member secured to said outer rim, a plurality of members each adjustable radially in said felly, a plunger extending from each of the adjustable members and terminating in a socket provided therefor in said outer rim and between the pneumatic tubes, and a corresponding number of resilient members each associated with a plunger so that the tension placed thereon is dependent upon the position of the corresponding adjustable member.

3. In a vehicle wheel, and in combination, a felly, a flanged inner rim, means for connecting said felly and rim, a divided outer rim, a pair of pneumatic tubes between the flanges of said inner rim and the parts of said outer rim, a solid tread connected to said outer rim, a pair of spaced circumferential ribs connected to the outer rim between the pneumatic tubes, a plurality of adjusting screws in said felly and inner rim, a plunger connected to each adjusting screw and extending from the same into the annular space between said ribs and being of substantially the same diameter as the width of said space, and resilient devices associated with said plungers and extending between said adjusting screws and said ribs so that the tension thereon is determined by the position of said adjusting screws.

4. In a vehicle wheel and in combination, a felly, a flanged inner rim, means for connecting said felly and rim, a divided outer rim, a pair of pneumatic tubes between the flanges of said inner rim and the parts of said divided outer rim, a solid tread connected to said outer rim, a pair of spaced circumferential ribs connected to the said outer rim between the said pneumatic tubes and extending toward the said inner rim, a plurality of adjusting screws in said flange and inner rim, a plunger connected to each adjusting screw and extending from the same into the annular space between the said ribs in which the free end of each plunger is movable only in the plane of the wheel, washers set in recesses provided therefor in the edges of said ribs, each washer being provided with an elongated opening through which one of said plungers extends, and a helical spring surrounding each plunger and extending between the corresponding adjusting screw and washer.

In testimony whereof we affix our signatures.

GEORGE S. GALLAGHER.
GUSTAV SCHADEE.